United States Patent
Han et al.

(10) Patent No.: US 10,007,828 B2
(45) Date of Patent: Jun. 26, 2018

(54) FINGERPRINT SENSOR INTEGRATED TYPE TOUCH SCREEN DEVICE

(71) Applicant: LG DISPLAY CO., LTD., Seoul (KR)

(72) Inventors: Manhyeop Han, Seoul (KR); Kyoseop Choo, Suwon-si (KR); Moonbong Song, Seoul (KR); Jiho Cho, Gimpo-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days. days.

(21) Appl. No.: 15/176,969

(22) Filed: Jun. 8, 2016

(65) Prior Publication Data

US 2017/0024602 A1     Jan. 26, 2017

(30) Foreign Application Priority Data

Jul. 20, 2015 (KR) .......................... 10-2015-0102351

(51) Int. Cl.
    *G06K 9/00*           (2006.01)
    *G06F 3/041*         (2006.01)
    *G06F 3/044*         (2006.01)

(52) U.S. Cl.
    CPC ......... *G06K 9/00013* (2013.01); *G06F 3/044* (2013.01); *G06F 3/0416* (2013.01)

(58) Field of Classification Search
    CPC .... G06K 9/00013; G06F 3/0416; G06F 3/044
    USPC ....................................................... 382/124
    See application file for complete search history.

(56) References Cited

U.S. PATENT DOCUMENTS

| | | | | |
|---|---|---|---|---|
| 7,961,919 | B2 * | 6/2011 | Chou | ........................ H03F 3/08 382/124 |
| 8,421,890 | B2 * | 4/2013 | Benkley, III | ......... G06K 9/0002 348/294 |
| 8,866,347 | B2 * | 10/2014 | Benkley, III | ........... G01N 27/04 307/116 |
| 9,229,591 | B2 * | 1/2016 | Kim | ........................ G06F 3/044 |
| 9,501,685 | B2 * | 11/2016 | Bernstein | ............. G06K 9/0002 |
| 9,514,350 | B2 * | 12/2016 | Wang | .................... G06K 9/0002 |
| 9,582,087 | B2 * | 2/2017 | Kang | ....................... G06F 3/044 |
| 9,779,280 | B2 * | 10/2017 | Benkley, III | ....... G06K 9/00033 |
| 2003/0035570 | A1 * | 2/2003 | Benkley, III | ......... G06K 9/0002 382/124 |
| 2009/0066665 | A1 | 3/2009 | Lee | |
| 2010/0189314 | A1 * | 7/2010 | Benkley | ............... G06K 9/0012 382/124 |
| 2011/0175703 | A1 * | 7/2011 | Benkley, III | ....... G06K 9/00053 340/5.82 |

(Continued)

*Primary Examiner* — Iman K Kholdebarin
(74) *Attorney, Agent, or Firm* — Dentons US LLP

(57) ABSTRACT

Disclosed is a fingerprint sensor integrated type touch screen device that includes a touch screen having at least one fingerprint & touch area and a plurality of touch areas, each touch area including Tx electrode lines of a first group crossing Rx electrode lines of the first group, and touch sensors at crossings of the Tx electrode lines of the first group and the Rx electrode lines of the first group; and a touch integrated circuit (IC) that supplies a sensor driving signal of a same phase to the Tx electrode lines of the first group, groups first effective Rx channels of the Rx electrode lines of the first group as a bundle, and simultaneously senses the first effective Rx channels through a first touch sensing part, wherein first ineffective Rx channels of the Rx electrode lines of the first group are electrically disconnected from the first touch sensing part.

16 Claims, 15 Drawing Sheets

(56) References Cited

U.S. PATENT DOCUMENTS

| | | | |
|---|---|---|---|
| 2011/0176037 A1* | 7/2011 | Benkley, III | G06K 9/0002 348/294 |
| 2012/0105081 A1 | 5/2012 | Shaikh et al. | |
| 2014/0333328 A1 | 11/2014 | Nelson et al. | |
| 2014/0354556 A1 | 12/2014 | Alameh et al. | |
| 2015/0091859 A1 | 4/2015 | Rosenberg et al. | |
| 2015/0185914 A1 | 7/2015 | Han et al. | |

* cited by examiner

FINGERPRINT SENSOR INTEGRATED TYPE TOUCH SCREEN DEVICE

This application claims the benefit of Korean Patent Application No. 10-2015-0102351 filed on Jul. 20, 2015, which is incorporated herein by reference for all purposes as if fully set forth herein.

BACKGROUND

Field

The present disclosure relates to a fingerprint sensor integrated type touch screen device and a method of driving the same, and more particularly to a touch screen device having a fingerprint recognition function.

Discussion of the Related Art

With the development of computer technology, computer based systems that can be applied to various utilities such as notebook computers, tablet personal computers (PCs), smart phones, personal digital assistants (PDAs), automated teller machines (ATMs), and information systems, have been developed. In general, computer based systems store various data including private information such as secret business information and personal information related to private affairs. Thus, strong security mechanisms are typically desired to protect such information.

To this end, fingerprint sensors have been developed to strengthen security by performing registration or certification of systems using fingerprints of human beings.

The fingerprint sensor is a sensor capable of sensing fingerprints of human beings. A fingerprint sensor can be classified into an optical fingerprint sensor and a capacitive fingerprint sensor.

The optical fingerprint sensor is based on the principle that a light source, such as a light emitting diode (LED), emits light and the light reflected from ridges and valleys of a fingerprint is sensed through a CMOS image sensor. Problems in this field concern an increase in size due to the use of LEDs and a rise in the product cost due to the use of expensive light source.

The capacitive fingerprint sensor utilizes a difference of electric charges charged between ridges and valleys of the fingerprint contacted thereto.

U.S. Patent Publication No. 2013/0307818 published on Nov. 21, 2013, and entitled "Capacitive Sensor Packaging" describes a capacitive fingerprint sensor of a related art. The published capacitive fingerprint sensor is configured as an assembly form coupled with a particular push button. The capacitive fingerprint sensor includes a silicon wafer on which a circuit for measuring a capacitance between a fingerprint (ridges and valleys) and a capacitive plate is printed.

In general, the capacitive fingerprint sensor described in US Patent Publication No. 2013/0307818 may need a high resolution sensor array and an integrated circuit (IC) for the fingerprint recognition processing because the fingerprint's ridges and valleys have a very minute size of about 300 μm to about 500 μm. To this end, the capacitive fingerprint sensor utilizes the silicon wafer for integrating the IC with the sensor array. However, when the IC and the high resolution sensor array are integrated using the silicon wafer, it is necessary for the capacitive fingerprint sensor to have an assembly configuration for coupling the fingerprint sensor with a push button. Thus, problems posed may include a complicated configuration and an increase in a non-display area (e.g., bezel area) of the optical fingerprint sensor due to the assembly configuration. Also, other problems may include the issue of increasing thickness and an area for sensing the fingerprint depends on the size of the push button (e.g., a home key of a smart phone) because the push button overlaps the fingerprint sensor.

To address the above-described problems, a technology has been developed to use an area of a touch sensor screen as a fingerprint recognition area. The technology is described in U.S. Pat. No. 8,564,314 issued on Oct. 22, 2013 and entitled "capacitive touch sensor for identifying a fingerprint" and Korean Patent No. 10-1432988 issued on Aug. 18, 2014 and entitled "fingerprint recognition integrated type capacitive touch screen".

FIG. 1 schematically shows an arrangement of driving electrodes and sensing electrodes of a capacitive sensing panel shown in U.S. Pat. No. 8,564,314. FIG. 2 shows configuration of a fingerprint recognition integrated type capacitive touch screen shown in Korean Patent No. 10-1432988. FIG. 3A shows a general touch sensor pattern, and FIG. 3B shows a high-density sensor pattern.

Referring to FIG. 1, a capacitive touch sensor for identifying a fingerprint includes a touch sensor 3 including touch driving electrodes 1(x) and touch sensing electrodes 1(y) and a fingerprint sensor 5 including fingerprint driving electrodes 5(x) and fingerprint sensing electrodes 5(y). In the capacitive touch sensor for identifying the fingerprint, because the separate fingerprint sensor 5 is partially disposed on a screen area, problems posed may include a non-touch of the fingerprint sensor 5 or a reduction in a touch performance around the fingerprint sensor 5.

Referring to FIG. 2, a fingerprint recognition integrated type capacitive touch screen includes a touch panel AA, electrode connection lines BB, and a touch controller CC. The touch panel AA forms fine channels A3 through a combination of first channel electrodes A1 (one of Tx and Rx) and second channel electrodes A2 (the other of Tx and Rx) crossing each other. The fine channels A3 are configured such that the fine channels A3 of a remaining area except an area of fingerprint recognition sensors A4 from the fine channels A3 form a plurality of groups each serving as a touch group channel A5 for sensing a touch signal, and the fine channels A3 corresponding to the area of the fingerprint recognition sensors A4 each serve as a fingerprint recognition channel A6.

However, this fingerprint recognition integrated type capacitive touch screen may greatly increase a mutual capacitance Cm between touch channels because of the fine channels A3 (i.e., the touch channels) serving as the touch group channel A5. Namely, a mutual capacitance Cm between touch channels in a high-density sensor pattern shown in FIG. 3B may increase to several tens to several hundreds of times a general touch sensor pattern shown in FIG. 3A. Because an increase in the mutual capacitance Cm reduces sensitivity of the touch sensor, a touch operation may not be recognized when the touch operation is generated.

SUMMARY

Accordingly, the present disclosure is directed to a fingerprint sensor integrated type touch screen device and a method of driving the same that substantially obviate one or more of the problems due to limitations and disadvantages of the related art.

An advantage of the present invention is to provide a fingerprint sensor integrated type touch screen device capable of reducing a mutual capacitance when a fingerprint sensor integrated type touch screen panel is configured to have a high-density electrode pattern.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a fingerprint sensor integrated type touch screen device may, for example, include a touch screen having at least one fingerprint & touch area and a plurality of touch areas, each touch area including Tx electrode lines of a first group crossing Rx electrode lines of the first group, and touch sensors at crossings of the Tx electrode lines of the first group and the Rx electrode lines of the first group; and a touch integrated circuit (IC) that supplies a sensor driving signal of a same phase to the Tx electrode lines of the first group, groups first effective Rx channels of the Rx electrode lines of the first group as a bundle, and simultaneously senses the first effective Rx channels through a first touch sensing part, wherein first ineffective Rx channels of the Rx electrode lines of the first group are electrically disconnected from the first touch sensing part.

The first infective Rx channels are floated.

The first infective Rx channels are connected to a low potential voltage source.

In the first infective Rx channels, first ineffective Rx channels adjacent to the first effective Rx channels are connected to a low potential voltage source, and remaining first ineffective Rx channels except the first ineffective Rx channels connected to the low potential voltage source are floated.

The touch screen in the fingerprint & touch area includes Tx electrode lines of a second group and Rx electrode lines of the second group arranged to cross each other, and fingerprint & touch sensors formed at crossings of the Tx electrode lines of the second group and the Rx electrode lines of the second group. The touch IC includes a switching block, a second touch sensing part, and a plurality of fingerprint sensing parts. In a touch sensing mode, the switching block connects second effective Rx channels among the Rx electrode lines of the second group to the second touch sensing part and floats second ineffective Rx channels except the second effective Rx channels from the Rx electrode lines of the second group. In a fingerprint sensing mode, the switching block individually connects the Rx electrode lines of the second group to the plurality of fingerprint sensing parts.

In the touch sensing mode, the touch IC supplies a sensor driving signal of the same phase to the Tx electrode lines of the second group. In the fingerprint sensing mode, the touch IC supplies a sensor driving signal, of which a phase is sequentially retarded, to the Tx electrode lines of the second group.

The switching block includes first switches that are turned on in response to a fingerprint enable signal and individually connect the Rx electrode lines of the second group to input terminals of the plurality of fingerprint sensors, and second switches that are turned on in response to a touch enable signal and commonly connect the second effective Rx channels of the Rx electrode lines of the second group to an input terminal of the second touch sensing part.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

A display device, to which a fingerprint sensor integrated type touch screen device according to an exemplary embodiment of the invention is applied, may be implemented based on a flat panel display, such as a liquid crystal display (LCD), a field emission display (FED), a plasma display panel (PDP), an organic light emitting diode (OLED) display, and an electrophoresis display (EPD). In the following description, embodiments of the invention will be described using the liquid crystal display as an example of the display device implemented based on the flat panel display. Other flat panel displays may also be used.

Reference will now be made in detail to embodiments of the invention, examples of which are illustrated in the accompanying drawings. Wherever possible, the same reference numbers will be used throughout the drawings to refer to the same or like parts. Detailed descriptions of known arts will be omitted if it is determined that the arts can mislead the embodiments of the invention.

Figure 1:
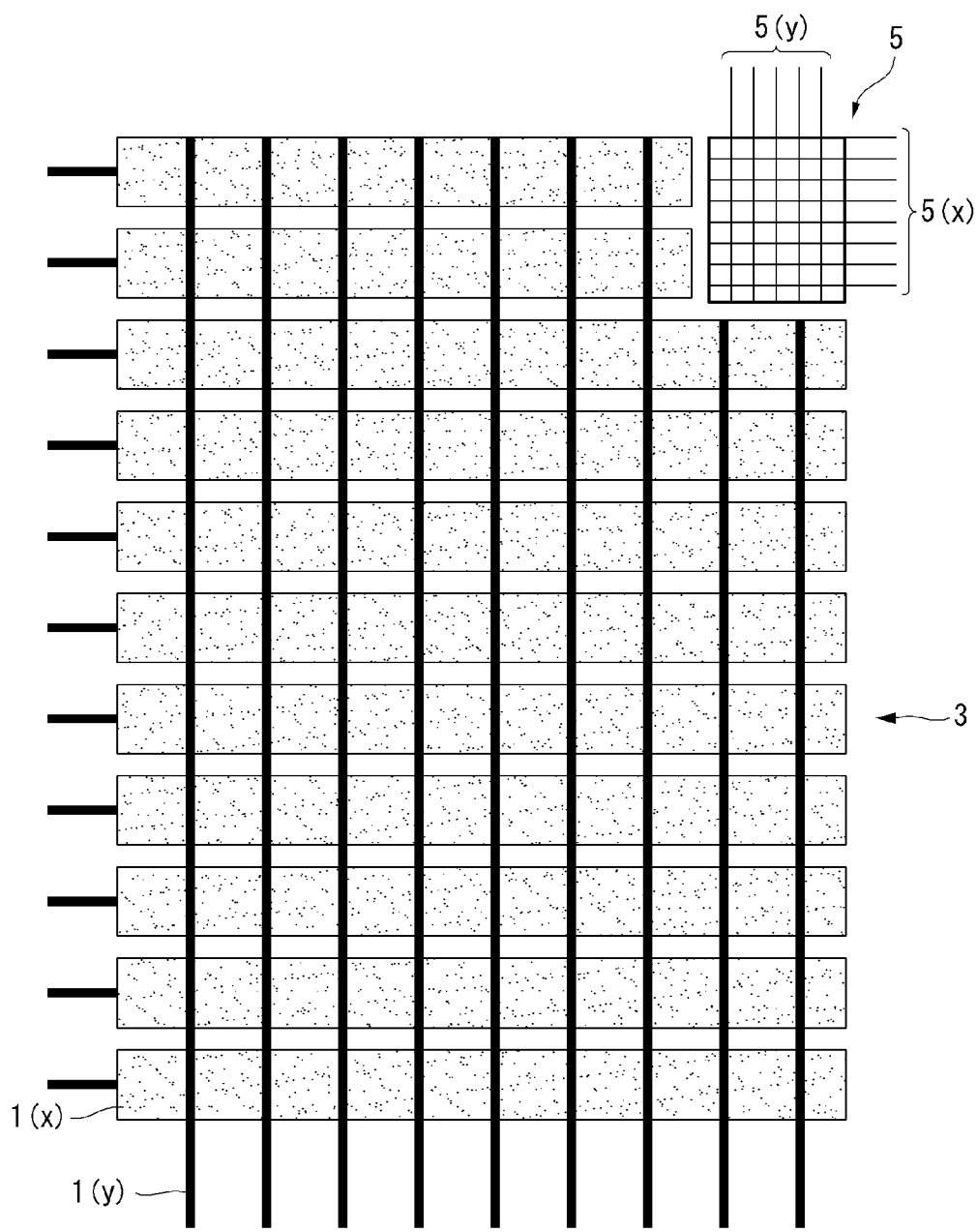
FIG. 1 is a plan view schematically showing an arrangement of driving electrodes and sensing electrodes of a capacitive sensing panel of a related art.
Figure 2:
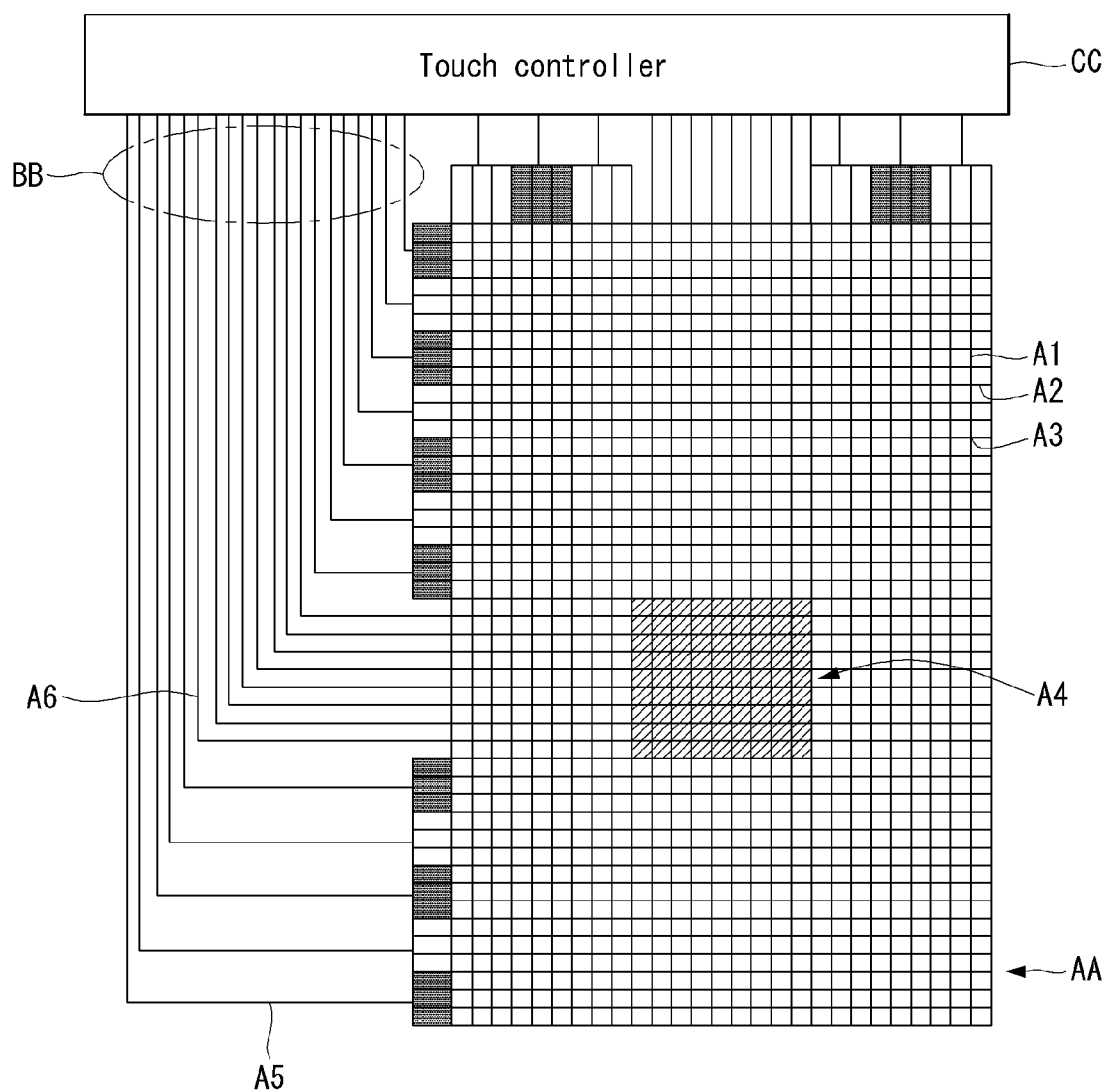
FIG. 2 shows configuration of a fingerprint recognition integrated type capacitive touch screen of a related art.
Figure 3A:
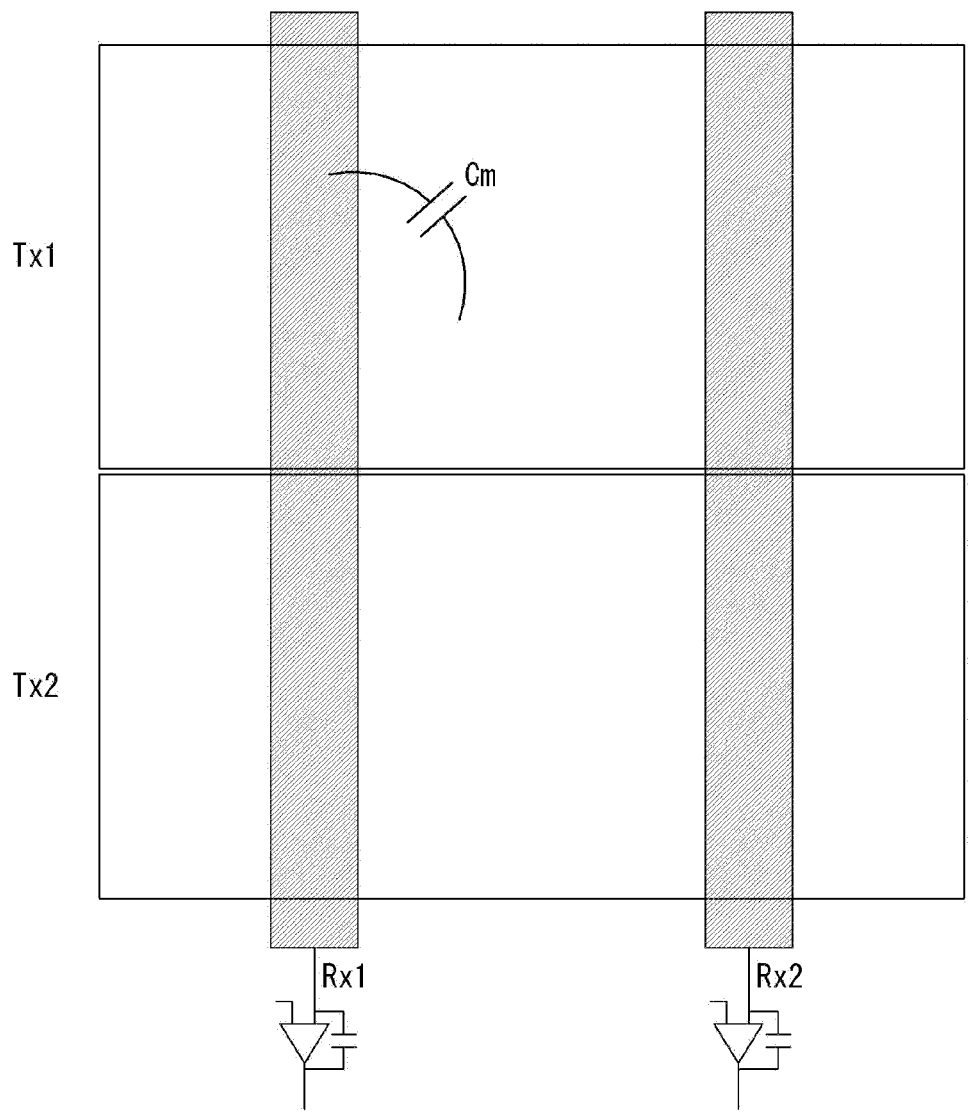
FIG. 3A shows a mutual capacitance generated in a general touch sensor pattern.
Figure 3B:
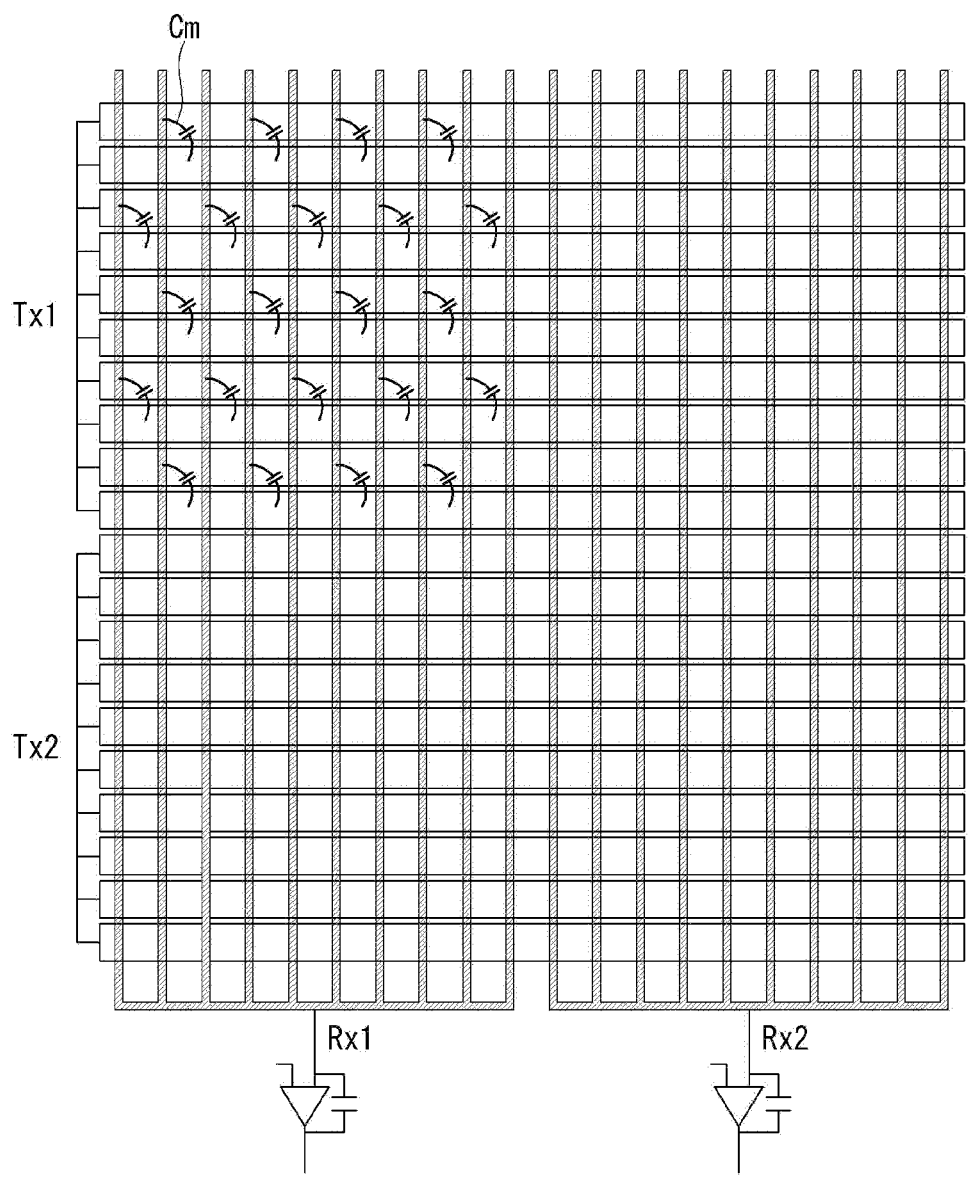
FIG. 3B shows a mutual capacitance generated in a high-density sensor pattern.
Figure 4:
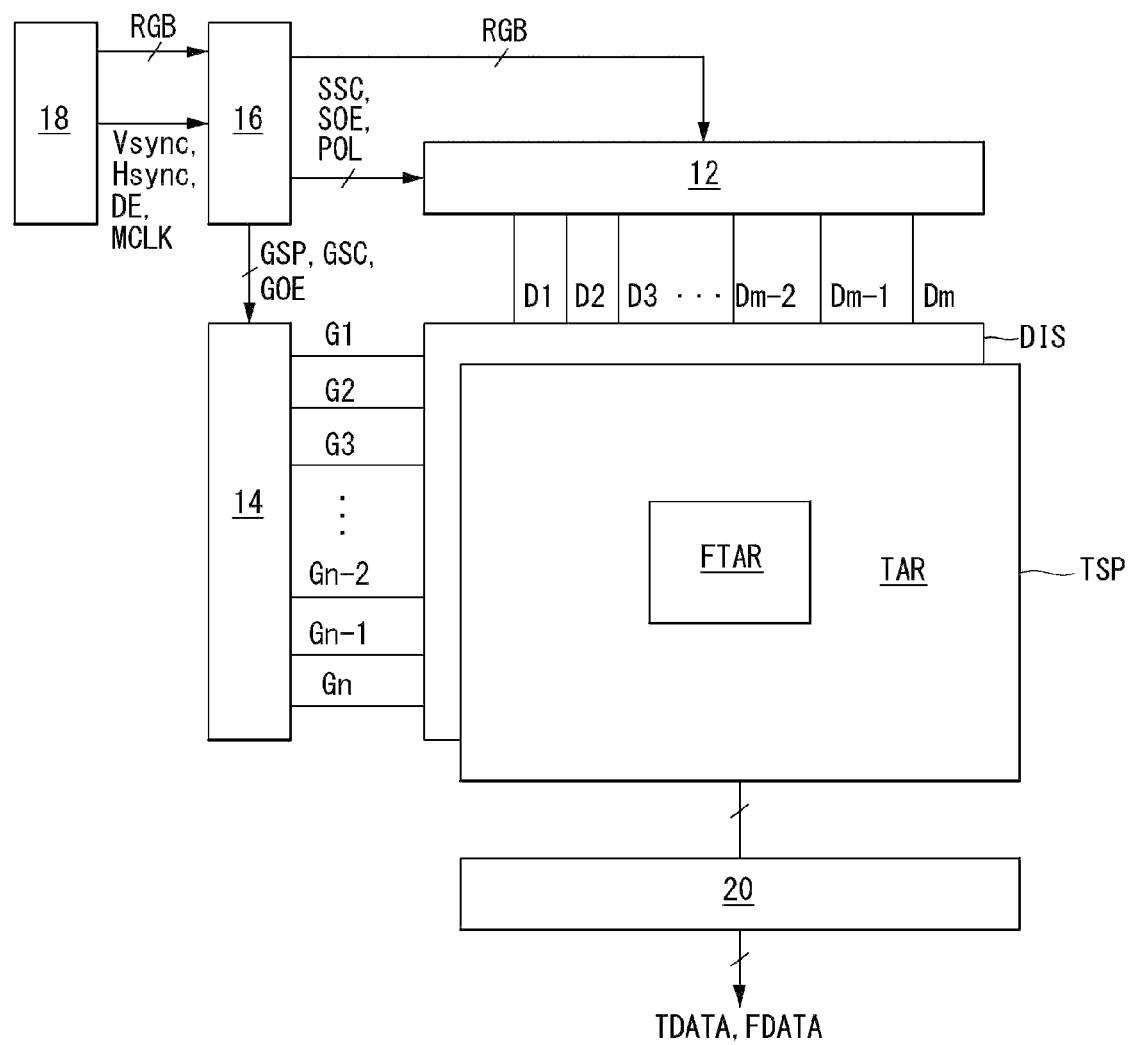
FIG. 4 is a block diagram showing a display device, to which a fingerprint sensor integrated type touch screen device according to an exemplary embodiment of the disclosure is applied.

FIG. 4 is a block diagram showing a display device, to which a fingerprint sensor integrated type touch screen device according to an exemplary embodiment of the invention is applied.

Referring to FIG. 4, a fingerprint sensor integrated type touch screen device according to the embodiment of the invention includes a touch screen TSP and a touch integrated circuit (IC) 20.

The fingerprint sensor integrated type touch screen device according to the embodiment of the disclosure may implement the touch screen TSP as a capacitive touch screen sensing a touch input through a plurality of capacitive sensors.

The capacitive touch screen may include a plurality of sensors, each having a capacitance. The capacitance may be divided into a self-capacitance and a mutual capacitance. The self-capacitance may be formed along a conductor line of a single layer formed in one direction, and the mutual capacitance may be formed between two conductor lines perpendicular to each other.

The touch screen TSP includes Tx electrode lines (or Tx channels) arranged in parallel with one another along a first direction, Rx electrode lines (or Rx channels) which are arranged in parallel with one another along a second direction and cross the Tx electrode lines, and mutual capacitance sensors respectively formed at crossings of the Tx electrode lines and the Rx electrode lines. Each mutual capacitance sensor includes a Tx electrode connected to the Tx electrode line, a Rx electrode connected to the Rx electrode line, and an insulating layer between the Tx electrode and the Rx electrode. The Tx electrode lines are driving signal lines that apply a sensor driving signal to each mutual capacitance sensor and supply charges to the mutual capacitance sensors. The Rx electrode lines are sensor lines that are connected to the mutual capacitance sensors and supply charges of the mutual capacitance sensor to the touch IC 20. A mutual capacitance sensing method may apply the sensor driving signal to the Tx electrode of the mutual capacitance sensor through the Tx electrode line, supply charges to the mutual capacitance sensor, and sense changes in a capacitance of the mutual capacitance sensor through the Rx electrode and the Rx electrode line in synchronization with the sensor driving signal, thereby sensing a touch input.

The touch screen TSP may be attached to an upper polarizing plate of a display panel DIS or formed between the upper polarizing plate and an upper substrate of the display panel DIS. Further, the sensors of the touch screen TSP may be embedded in a pixel array of the display panel DIS.

The Tx electrode lines and the Rx electrode lines are formed on the touch screen TSP as a fine pattern, i.e., a high-density electrode pattern. The touch screen TSP has at least one fingerprint & touch area FTAR and a plurality of touch areas TAR. The fingerprint & touch area FTAR includes a plurality of fingerprint & touch sensors, and each of the touch areas TAR includes a plurality of touch sensors. In the following description, the embodiments of the invention describe one fingerprint & touch area FTAR, as an example, but they are not limited thereto. Further, the embodiments of the invention describe that the fingerprint & touch area FTAR is positioned in the center of the plurality of touch areas TAR but other positions may be employed. For example, the fingerprint & touch area FTAR may be positioned in one of the plurality of touch areas TAR. A formation position of the fingerprint & touch area FTAR and the touch areas TAR on the touch screen TSP overlaps an image display area of the display panel DIS.

Because the Tx electrode lines and the Rx electrode lines are formed as a high-density electrode pattern, fingerprint & touch sensors are minutely formed so that the several fingerprint & touch sensors may be positioned between ridges and valleys of a fingerprint. Hence, fingerprint sensing can be accurately performed. Because the Tx electrode lines and the Rx electrode lines are formed as a high-density electrode pattern, touch sensors are minutely implemented. However, because the touch sensing does not require a definition as high as that of the fingerprint sensing, the touch sensors are grouped based on the touch areas TAR and are simultaneously driven and sensed on a per touch area basis so as to reduce power consumption and a touch report rate.

When the touch sensors are grouped based on the touch areas TAR and are simultaneously driven and sensed on a per touch area basis as described above, a sensing performance of the touch sensors may be reduced due to an excessive increase in mutual capacitances of the touch sensors when they are simultaneously sensed, as discussed in the description of the related art. Hence, an embodiment of the invention selectively senses some of the Rx electrode lines of each touch area TAR and floats or grounds the Rx electrode lines of each touch area TAR that are not sensed, so as to reduce a side effect of a sharp increase in the mutual capacitance of the touch sensors resulting from the high-density electrode pattern when the touch sensors are grouped based on the touch areas TAR.

The touch IC 20 includes a driving signal supply unit supplying a sensor driving signal to the Tx electrode lines and a sensing unit sensing the Rx electrode lines. The sensing unit includes a touch sensing unit sensing touch information from the Rx electrode lines and a fingerprint sensing unit sensing fingerprint information from the Rx electrode lines. The touch IC 20 further includes a switching block selectively connecting the Rx electrode lines of the fingerprint & touch area FTAR to the touch sensing unit and the fingerprint sensing unit. The switching block reversely switches switching operations in response to a touch enable signal and a fingerprint enable signal received from the outside.

The touch IC 20 transmits touch coordinate information TDATA and fingerprint sensing information FDATA obtained through the sensing to a host system 18.

The display device, to which the fingerprint sensor integrated type touch screen device according to the embodiment of the invention is applied, may include the display panel DIS, a display driving circuit, and the host system 18.

The display panel DIS includes a liquid crystal layer formed between an upper substrate and a lower substrate. A pixel array of the display panel DIS includes pixels formed in pixel areas defined by data lines D1 to Dm and gate lines G1 to Gn, where m and n are a positive integer. Each pixel may include thin film transistors (TFTs) formed at crossings of the data lines D1 to Dm and the gate lines G1 to Gn, a pixel electrode charged with a data voltage, a storage capacitor Cst which is connected to the pixel electrode and holds a voltage of a liquid crystal cell, and the like.

Black matrixes, color filters, etc. may be formed on the upper substrate of the display panel DIS. The lower substrate of the display panel DIS may be configured as a COT (color filter on TFT) structure. In this instance, the black matrixes and the color filters may be formed on the lower substrate of the display panel DIS. A common electrode supplied with a common voltage may be formed on the upper substrate or the lower substrate of the display panel DIS. Polarizing plates are respectively attached to the upper substrate and the lower substrate of the display panel DIS. Alignment layers for setting a pre-tilt angle of liquid crystals are respectively formed on the inner surfaces contacting liquid crystals in the upper substrate and the lower substrate of the display panel DIS. A column spacer is formed between the upper substrate and the lower substrate of the display panel DIS to keep cell gaps of the liquid crystal cells constant.

A backlight unit may be disposed under a back surface of the display panel DIS. The backlight unit may be implemented as one of an edge type backlight unit and a direct type backlight unit and irradiates light onto the display panel DIS. The display panel DIS may be implemented in any known liquid crystal mode including a twisted nematic (TN) mode, a vertical alignment (VA) mode, an in-plane switching (IPS) mode, a fringe field switching (FFS) mode, etc.

The display driving circuit includes a data driving circuit 12, a scan driving circuit 14, and a timing controller 16. The display driving circuit applies digital video data RGB of an input image to the pixels of the display panel DIS. The data driving circuit 12 converts the digital video data RGB received from the timing controller 16 into positive and negative analog gamma compensation voltages and outputs the data voltage. The data driving circuit 12 then supplies the data voltage to the data lines D1 to Dm. The scan driving circuit 14 sequentially supplies a gate pulse (or a scan pulse) synchronized with the data voltage to the gate lines G1 to Gn and selects pixel lines of the display panel DIS, to which the data voltage is applied.

The timing controller 16 receives timing signals, such as a vertical sync signal Vsync, a horizontal sync signal Hsync, a data enable signal DE, and a main clock MCLK, from the host system 18. The timing controller 16 synchronizes operation timings of the data driving circuit 12 and the scan driving circuit 14 with each other. The timing controller 16 generates a data timing control signal and a scan timing control signal for respectively controlling the operation timings of the data driving circuit 12 and the scan driving circuit 14 using the timing signals. The data timing control signal includes a source sampling clock SSC, a source output enable signal SOE, a polarity control signal POL, etc. The scan timing control signal includes a gate start pulse GSP, a gate shift clock GSC, a gate output enable signal GOE, and the like.

The host system 18 may be implemented as one of a phone system, a television system, a set-top box, a navigation system, a DVD player, a Blu-ray player, a personal computer (PC), and a home theater system. The host system 18 includes a system on chip (SoC) including a scaler and converts the digital video data RGB of the input image into a format suitable for displaying on the display panel DIS. The host system 18 transmits the digital video data RGB and the timing signals Vsync, Hsync, DE, and MCLK to the timing controller 16. Further, the host system 18 may execute an application associated with a touch report received from the touch IC 20.

Figure 5:
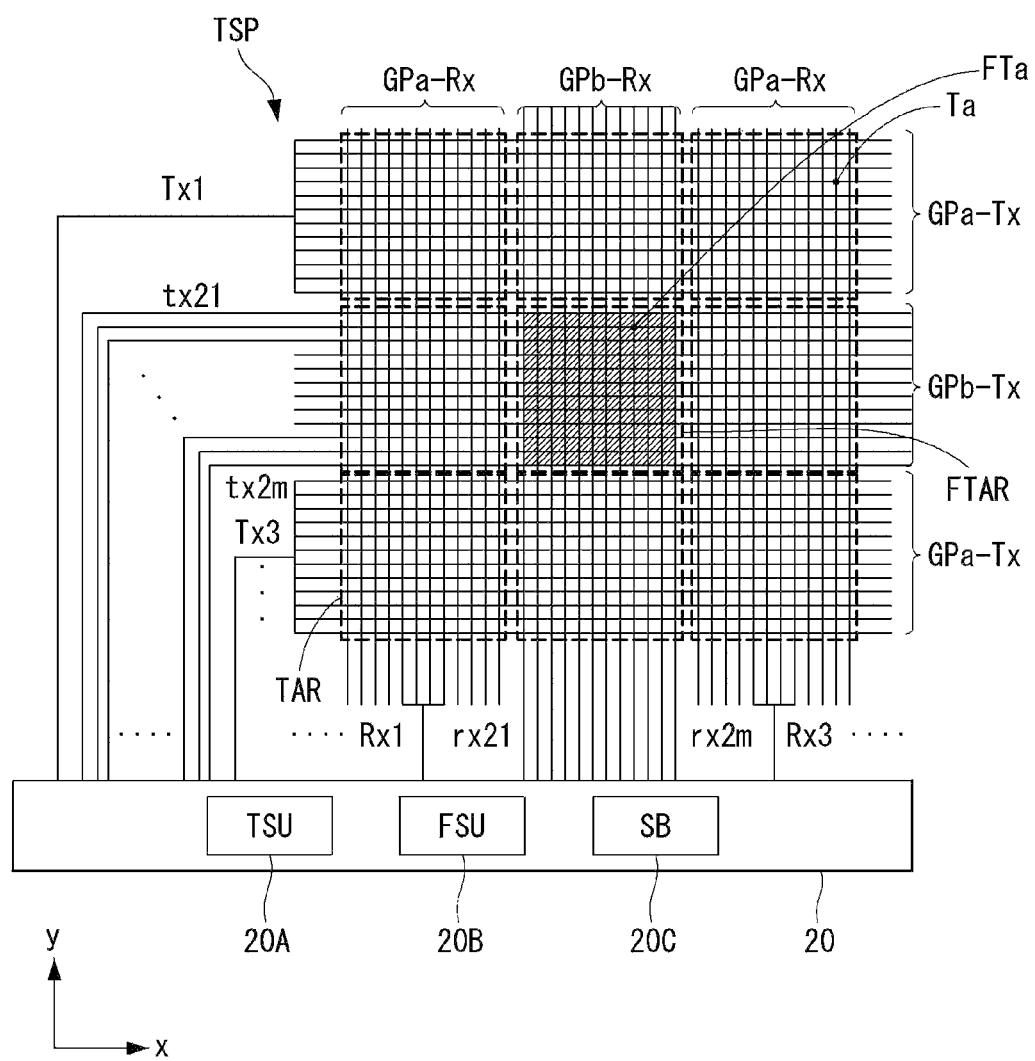
FIG. 5 illustrates a fingerprint sensor integrated type touch screen device according to an exemplary embodiment of the disclosure.
Figure 6:
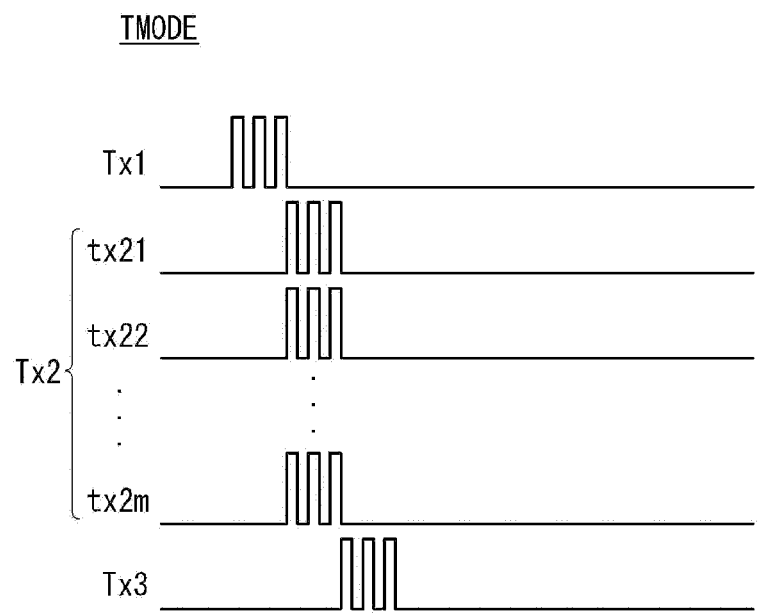
FIG. 6 is a waveform diagram of a sensor driving signal applied to a fingerprint sensor integrated type touch screen in a touch sensing mode.
Figure 7:
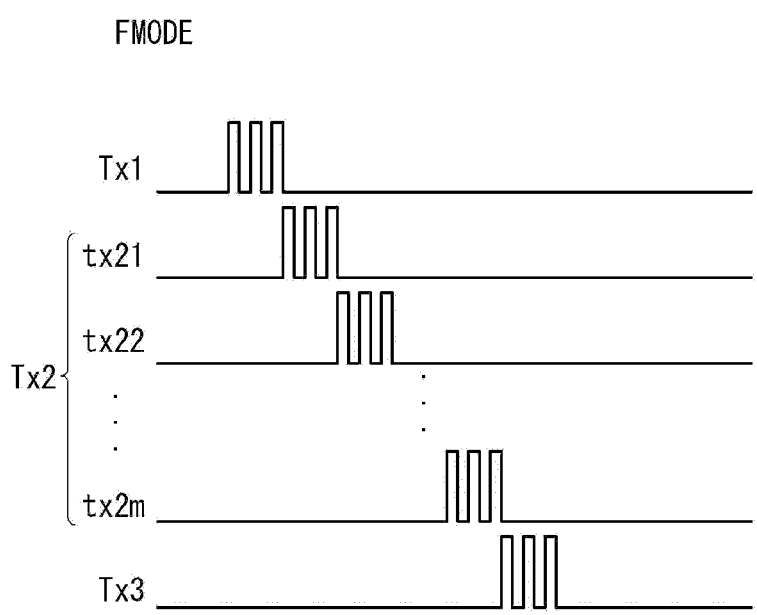
FIG. 7 is a waveform diagram of a sensor driving signal applied to a fingerprint sensor integrated type touch screen in a fingerprint sensing mode.

FIG. 5 illustrates a fingerprint sensor integrated type touch screen device according to an embodiment of the invention. FIG. 6 is a waveform diagram of a sensor driving signal applied to a fingerprint sensor integrated type touch screen in a touch sensing mode. FIG. 7 is a waveform diagram of a sensor driving signal applied to a fingerprint sensor integrated type touch screen in a fingerprint sensing mode.

Referring to FIG. 5, each touch area TAR of the touch screen TSP includes Tx electrode lines GPa-Tx of a first group arranged in parallel with one another in a first direction y, Rx electrode lines GPa-Rx of the first group which are arranged in parallel with one another in a second direction x and cross the Tx electrode lines GPa-Tx of the first group, and touch sensors Ta formed at crossings of the Tx electrode lines GPa-Tx of the first group and the Rx electrode lines GPa-Rx of the first group.

The fingerprint & touch area FTAR of the touch screen TSP includes Tx electrode lines GPb-Tx of a second group arranged in parallel with one another in the first direction y, Rx electrode lines GPb-Rx of the second group which are arranged in parallel with one another in the second direction x and cross the Tx electrode lines GPb-Tx of the second group, and fingerprint & touch sensors FTa formed at crossings of the Tx electrode lines GPb-Tx of the second group and the Rx electrode lines GPb-Rx of the second group.

The touch IC 20 activates a touch sensing mode TMODE in response to a touch enable signal TEN (refer to FIG. 13) received from the host system 18 and activates a fingerprint sensing mode FMODE in response to a fingerprint enable signal FEN (refer to FIG. 13) received from the host system 18.

As shown in FIG. 6, in the touch sensing mode TMODE, the touch IC 20 supplies a sensor driving signal of a same phase to Tx electrode lines of a same group. In the touch sensing mode TMODE, the touch IC 20 groups the Tx electrode lines and sequentially drives the Tx electrode lines on a per group basis. Further, the touch IC 20 groups the Rx electrode lines in synchronization with the Tx electrode lines and senses the Rx electrode lines through a touch sensing unit (TSU) 20A. In this instance, only some of the Rx electrode lines belonging to the same group are sensed, so as to prevent a sharp increase in the mutual capacitance. For example, in the touch sensing mode TMODE, the touch IC 20 connects some of the Rx electrode lines GPb-Rx of the second group to the touch sensing unit 20A through the switching block (SB) 20C. In the touch sensing mode TMODE, the touch IC 20 senses a change in charges of the sensor input through the Rx electrode lines GPa-Rx and GPb-Rx of the first and second groups and determines a touch or a non-touch of a conductive material, for example, a finger and a touch position when a touch operation is performed.

As shown in FIG. 7, in the fingerprint sensing mode FMODE, the touch IC 20 supplies a sensor driving signal, of which a phase is sequentially retarded, to the Tx electrode lines GPb-Tx (or tx21 to tx2m in FIG. 7) of the second group while sequentially driving the Tx electrode lines GPa-Tx of the first group on a per group basis, thereby individually and sequentially driving the Tx electrode lines GPb-Tx (or tx21 to tx2m) of the second group. The touch IC 20 individually senses the Rx electrode lines GPb-Rx of the second group in synchronization with the Tx electrode lines GPb-Tx (or tx21 to tx2m) of the second group. For this, in the fingerprint sensing mode FMODE, the touch IC 20 connects the Rx electrode lines GPb-Rx of the second group to a fingerprint sensing unit (FSU) 20B through the switching block (SB) 20C. In the fingerprint sensing mode FMODE, the touch IC 20 senses a change in charges of the sensor input through the Rx electrode lines GPb-Rx of the second group and determines a fingerprint input.

Figure 8:
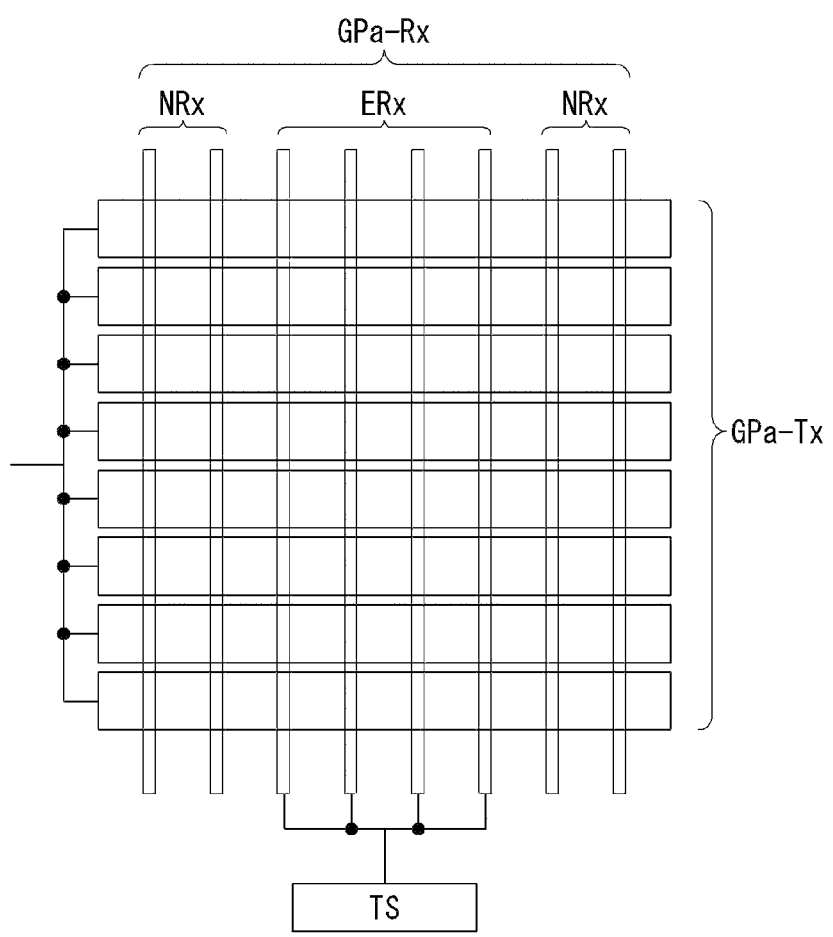
FIG. 8 illustrates Tx electrode lines of a first group and Rx electrode lines of the first group formed in one touch area of FIG. 6.
Figure 9:
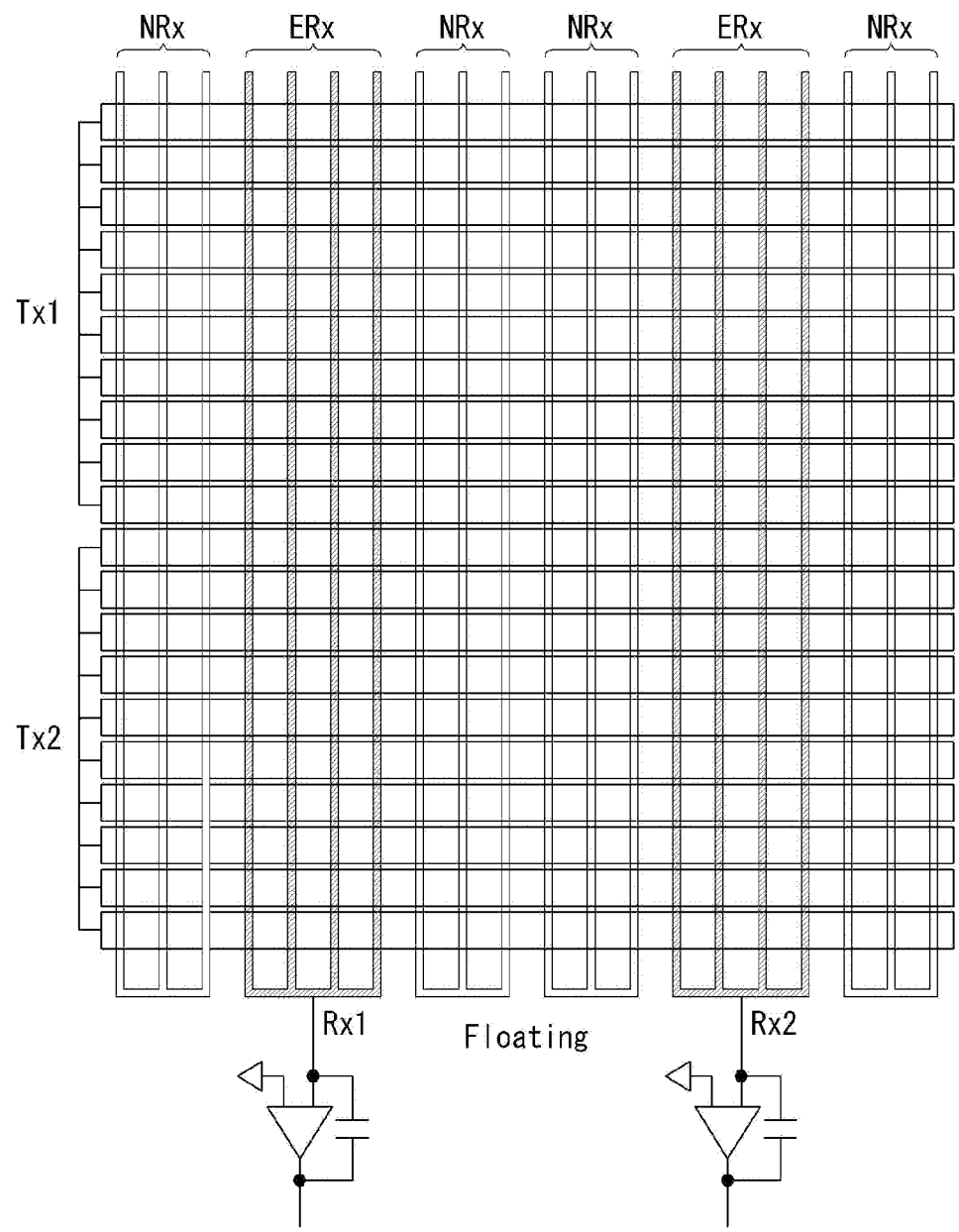
FIGS. 9 to 11 illustrate methods for reducing a mutual capacitance when a fingerprint sensor integrated type touch screen panel is configured to have a high-density electrode pattern.
Figure 10:
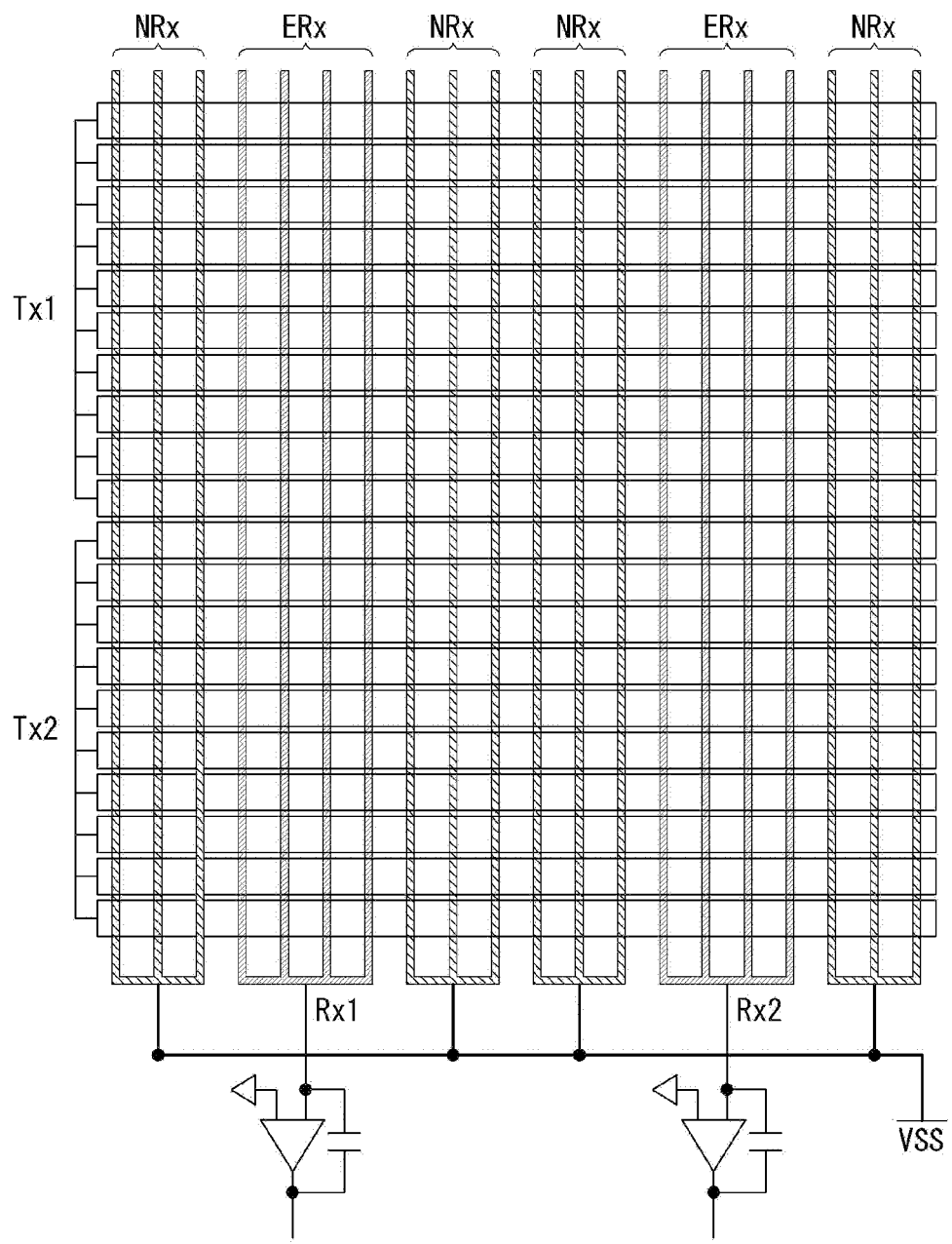
Figure 11:
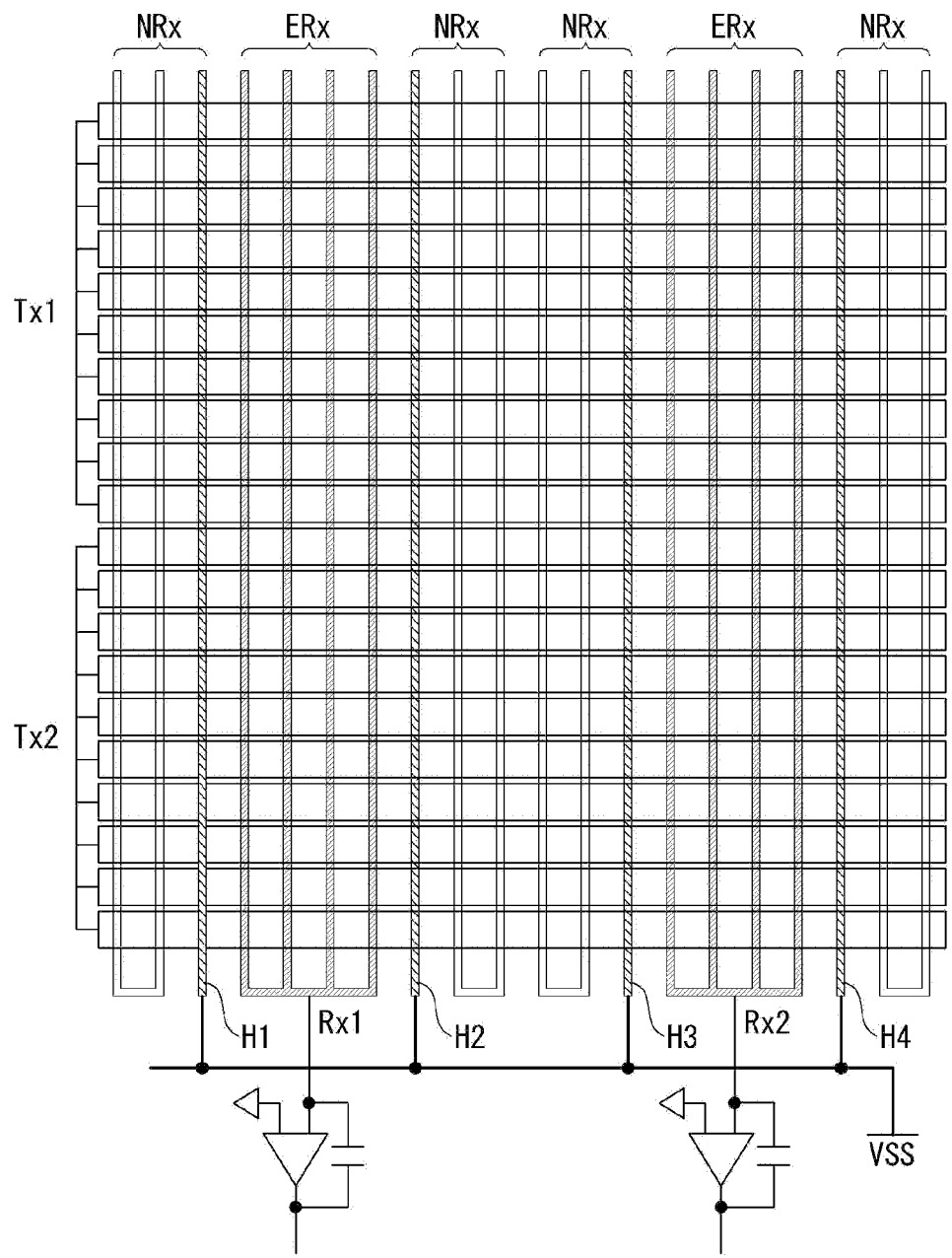

FIG. 8 shows Tx electrode lines of a first group and Rx electrode lines of the first group formed in one touch area of FIG. 6. FIGS. 9 to 11 illustrate methods for reducing a mutual capacitance when a fingerprint sensor integrated type touch screen panel is configured to have a high-density electrode pattern.

Referring to FIG. 8, in one touch area TAR, the Tx electrode lines GPa-Tx of the first group and the Rx electrode lines GPa-Rx of the first group cross each other. In the touch sensing mode TMODE, the touch IC 20 supplies the sensor driving signal of the same phase to the Tx electrode lines GPa-Tx of the first group and makes only first effective Rx channels ERx among the Rx electrode lines GPa-Rx of the first group as a bundle, thereby simultaneously sensing the first effective Rx channels ERx through a corresponding touch sensing part TS. The touch IC 20 disconnects first ineffective Rx channels NRx except the first effective Rx channels ERx from the Rx electrode lines GPa-Rx of the first group from the corresponding touch sensing part TS.

As shown in FIG. 9, the touch IC 20 floats the ineffective Rx channels NRx, which are disconnected from the touch sensing part TS, among the Rx electrode lines GPa-Rx of the first group and thus can reduce the mutual capacitance.

As shown in FIG. 10, the touch IC 20 connects the ineffective Rx channels NRx, which are disconnected from the touch sensing part TS, among the Rx electrode lines GPa-Rx of the first group to a low potential voltage source VSS and thus can reduce the mutual capacitance.

As shown in FIG. 11, the touch IC 20 floats some of the ineffective Rx channels NRx, which are disconnected from the touch sensing part TS, among the Rx electrode lines GPa-Rx of the first group and grounds the ineffective Rx channels NRx which are not floated, thereby reducing the mutual capacitance. In this instance, in the ineffective Rx channels NRx, the ineffective Rx channels H1, H2, H3, and H4 adjacent to the effective Rx channels ERx may be connected to the low potential voltage source VSS, and remaining ineffective Rx channels except the ineffective Rx channels H1, H2, H3, and H4 may be floated.

Figure 12:
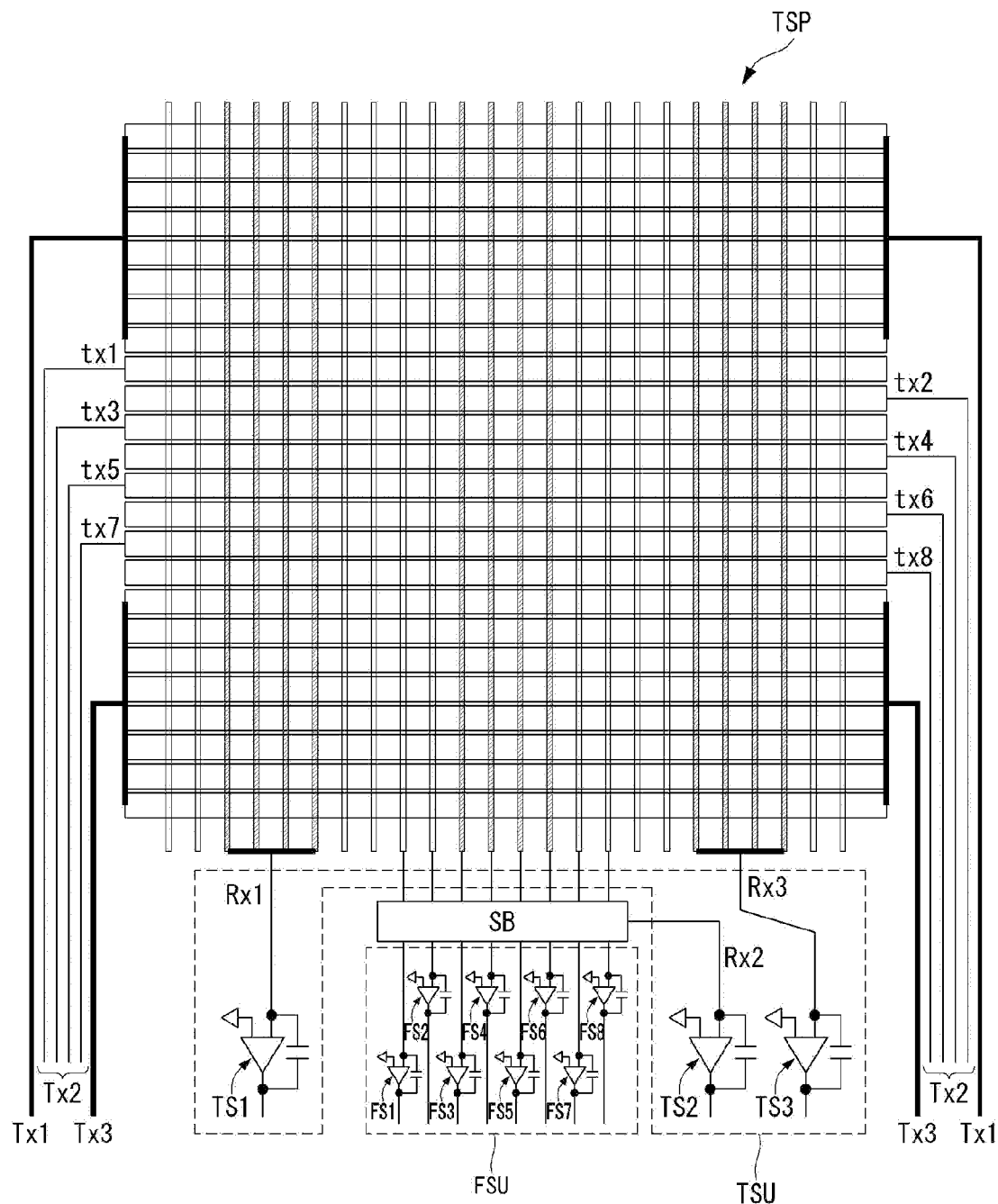
FIG. 12 illustrates in detail a touch integrated circuit (IC) of a fingerprint sensor integrated type touch screen device shown in FIG. 5.
Figure 13:
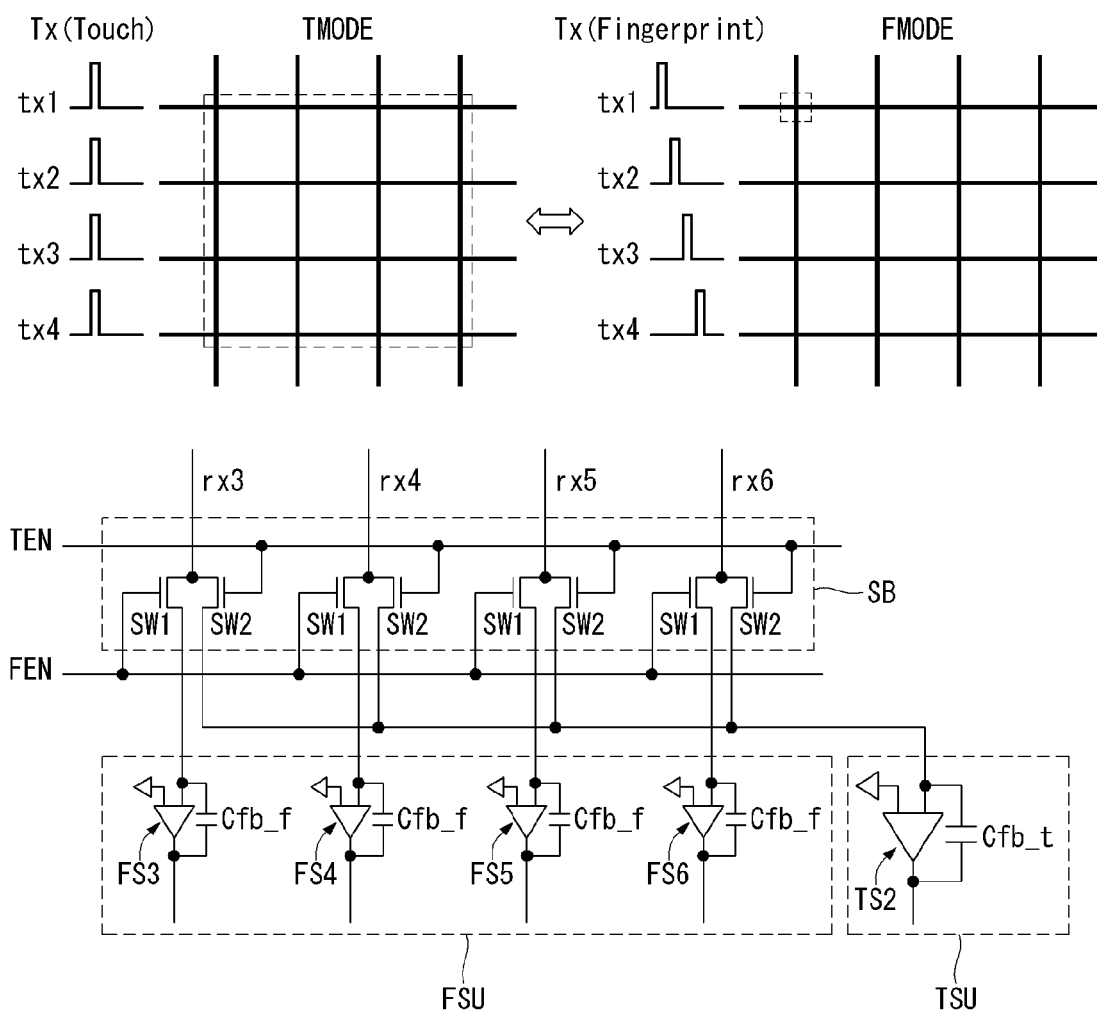
FIG. 13 illustrates in detail a configuration and an operation of a switching block shown in FIG. 12.
Figure 14A:
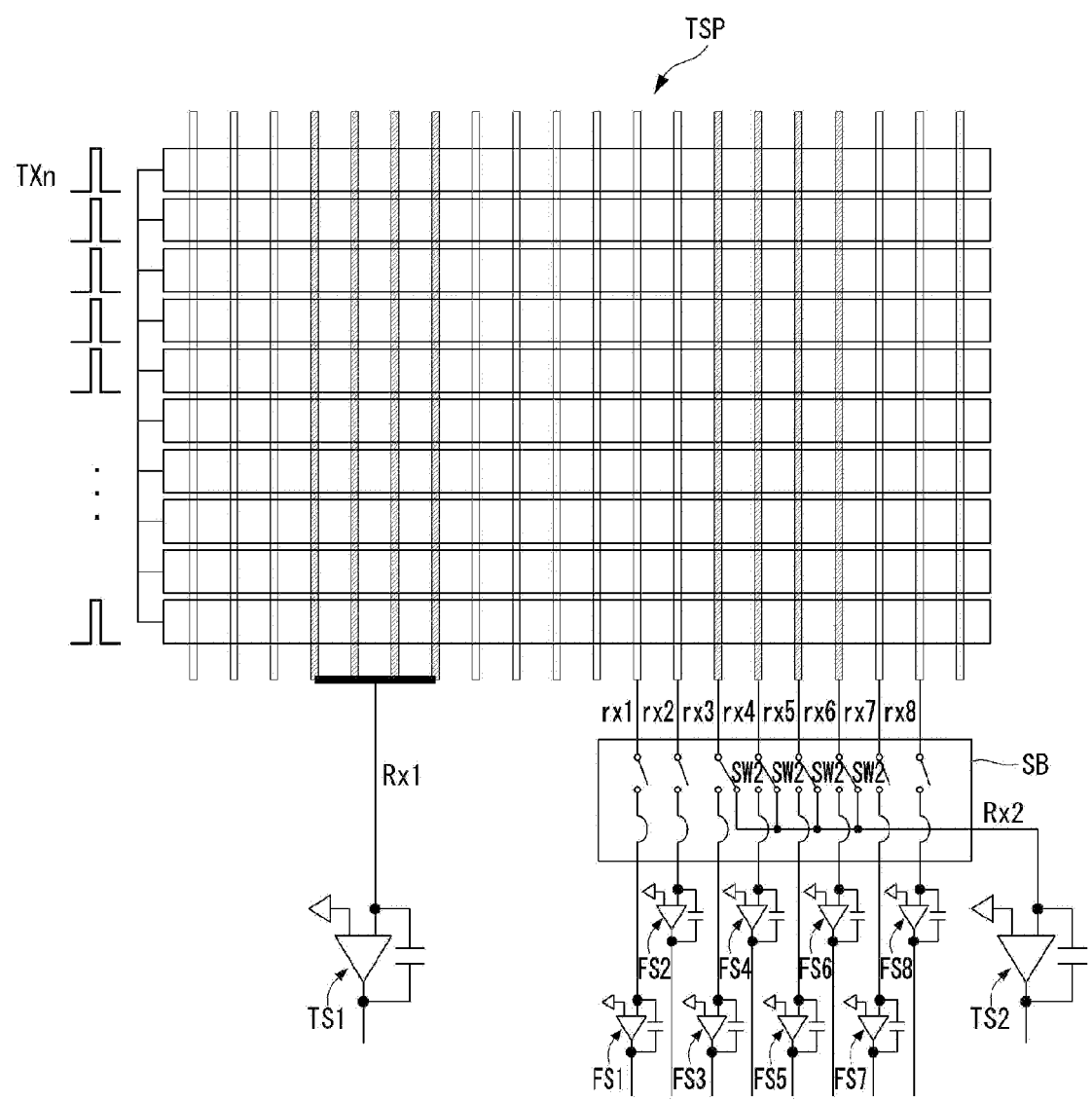
FIG. 14A illustrates an operation of a fingerprint sensor integrated type touch screen device in a touch sensing mode.
Figure 14B:
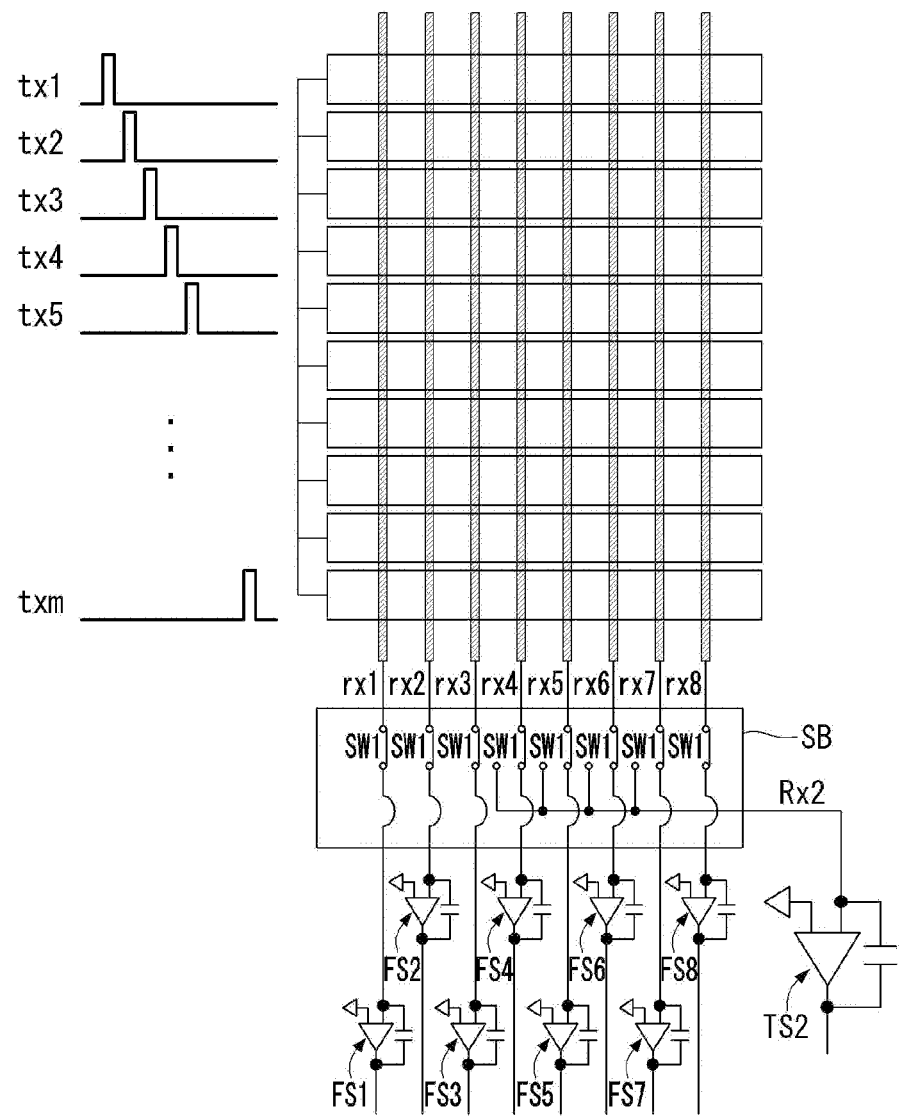
FIG. 14B illustrates an operation of a fingerprint sensor integrated type touch screen device in a fingerprint sensing mode.

FIG. 12 shows in detail the touch IC of the fingerprint sensor integrated type touch screen device shown in FIG. 5. FIG. 13 illustrates in detail a configuration and an operation of a switching block shown in FIG. 12. FIG. 14A illustrates an operation of the fingerprint sensor integrated type touch screen device in a touch sensing mode, and FIG. 14B illustrates an operation of the fingerprint sensor integrated type touch screen device in a fingerprint sensing mode.

Referring to FIGS. 12 to 14B, the touch IC 20 includes a touch sensing unit TSU including a plurality of touch sensing parts TS1, TS2, and TS3, a fingerprint sensing unit FSU including a plurality of fingerprint sensing parts FS1 to FS8, and a switching block SB selectively connecting the Rx electrode lines GPb-Rx of the second group to one of the touch sensing unit TSU and the fingerprint sensing unit FSU. The touch sensing unit TSU senses touch information, and the fingerprint sensing unit FSU senses fingerprint information.

The touch sensing parts TS1 and TS3 are connected to effective Rx channels ERx belonging to the Rx electrode lines GPa-Rx of the first group.

As shown in FIG. 14A, in a touch sensing mode, the switching block SB commonly connects effective Rx channels rx3, rx4, rx5, and rx6 belonging to the Rx electrode lines GPb-Rx of the second group to the touch sensing part TS2. As shown in FIG. 14B, in a fingerprint sensing mode, the switching block SB individually connects all of effective Rx channels rx1 to rx8 belonging to the Rx electrode lines GPb-Rx of the second group to the fingerprint sensing parts FS1 to FS8, respectively.

As shown in FIG. 13, the switching block SB includes first switches SW1 which are turned on in response to a fingerprint enable signal FEN and individually connect the Rx electrode lines GPb-Rx of the second group to input terminals of the fingerprint sensing parts FS1 to FS8, and second switches SW2 which are turned on in response to a touch enable signal TEN and commonly connect the effective Rx channels rx3, rx4, rx5, and rx6 of the Rx electrode lines GPb-Rx of the second group to an input terminal of the touch sensing part TS2.

Each of the touch sensing parts TS1, TS2, and TS3 includes an operational amplifier (Op amp) and a first sensing capacitor Cfb_t. An inverting input terminal of the Op amp is connected to the Rx electrode line, and a non-inverting input terminal of the Op amp is connected to a ground level voltage source. The first sensing capacitor Cfb_t is connected between the inverting input terminal of the Op amp and an output terminal of the Op amp.

Each of the fingerprint sensing parts FS1 to FS8 includes an operational amplifier (Op amp) and a second sensing capacitor Cfb_f. An inverting input terminal of the Op amp is connected to the Rx electrode line, and a non-inverting input terminal of the Op amp is connected to a ground level voltage source. The second sensing capacitor Cfb_f is connected between the inverting input terminal of the Op amp and an output terminal of the Op amp.

A capacity of the first sensing capacitor Cfb_t is designed to be greater than a capacity of the second sensing capacitor Cfb_f. This is because a capacity of the sensing capacitor is determined depending on the number of Rx electrode lines connected to the sensing part.

As described above, the embodiment of the invention selectively senses only some of the Rx electrode lines of each touch area when the touch sensors are grouped on a per touch area basis, and floats or grounds the not-sensed Rx electrode lines. Hence, the embodiment of the invention can greatly reduce a side effect of a sharp increase in the mutual capacitance generated when the fingerprint sensor integrated type touch screen panel is configured to have a high-density electrode pattern.

Furthermore, the embodiment of the invention can implement a narrow bezel area design because a separate fingerprint sensor area does not need to be formed in the bezel area.

Furthermore, because the embodiment of the invention can implement both a fingerprint recognition function and a touch recognition function in one area on which a screen is displayed, a dead zone capable of recognizing a touch operation can be reduced or prevented from being generated in the screen area, and the immediacy or the convenience in terms of UI/UX can be improved.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A fingerprint sensor integrated type touch screen device comprising:
a touch screen having at least one first area for recognizing a fingerprint and a touch event and a plurality of second areas for recognizing the touch event, each of the second areas including driving electrode lines of a first group crossing sensing electrode lines of a first group, and touch sensors at crossings of the driving electrode lines of the first group and the sensing electrode lines of the first group; and
a touch integrated circuit (IC) that supplies a sensor driving signal of a same phase to the driving electrode lines of the first group, groups first effective channels of the sensing electrode lines of the first group as a bundle, and simultaneously senses the first effective channels through a first touch sensing part,
wherein first ineffective channels of the sensing electrode lines of the first group are electrically disconnected from the first touch sensing part, and
wherein the at least one first area includes driving electrode lines of a second group and sensing electrode lines of a second group crossing over each other, and fingerprint and touch sensors formed at crossings of the driving electrode lines of the second group and the sensing electrode lines of the second group.

2. The fingerprint sensor integrated type touch screen device of claim 1, wherein the first ineffective channels are floated.

3. The fingerprint sensor integrated type touch screen device of claim 1, wherein the first ineffective channels are connected to a low potential voltage source.

4. The fingerprint sensor integrated type touch screen device of claim 1, wherein first ineffective channels positioned adjacent to the first effective channels are connected to a low potential voltage source, and remaining first ineffective channels not connected to the low potential voltage source are floated.

5. The fingerprint sensor integrated type touch screen device of claim 1,
wherein the touch IC includes a switching block, a second touch sensing part, and a plurality of fingerprint sensing parts,
wherein in a touch sensing mode, the switching block connects second effective channels of the sensing electrode lines of the second group to the second touch sensing part and floats second ineffective channels of the sensing electrode lines of the second group, and
wherein in a fingerprint sensing mode, the switching block individually connects the sensing electrode lines of the second group to the plurality of fingerprint sensing parts.

6. The fingerprint sensor integrated type touch screen device of claim 5, wherein in the touch sensing mode, the touch IC supplies a sensor driving signal of a same phase to the driving electrode lines of the second group, and
wherein in the fingerprint sensing mode, the touch IC supplies a sensor driving signal, of which a phase is sequentially retarded, to the driving electrode lines of the second group.

7. The fingerprint sensor integrated type touch screen device of claim 5, wherein the switching block includes:
first switches that are turned on in response to a fingerprint enable signal and individually connect the sensing electrode lines of the second group to input terminals of the plurality of fingerprint sensing parts; and
second switches that are turned on in response to a touch enable signal and commonly connect the second effective channels of the sensing electrode lines of the second group to an input terminal of the second touch sensing part.

8. The fingerprint sensor integrated type touch screen device of claim 5, wherein each of the first and second touch sensing parts includes a touch sensing operational amplifier and a first sensing capacitor.

9. The fingerprint sensor integrated type touch screen device of claim 8, wherein each touch sensing operational amplifier of the first and second touch terminals includes an inverting input terminal connected to the first and second effective channels, respectively, and
wherein a non-inverting input terminal of each touch sensing operational amplifier is connected to a ground level voltage source.

10. The fingerprint sensor integrated type touch screen device of claim 9, wherein the first sensing capacitor is connected between the inverting input terminal and an output terminal of each touch sensing operational amplifier.

11. The fingerprint sensor integrated type touch screen device of claim 10, wherein each of the plurality of fingerprint sensing parts includes a fingerprint sensing operational amplifier and a second sensing capacitor.

12. The fingerprint sensor integrated type touch screen device of claim 11, wherein an inverting input terminal of each fingerprint sensing operational amplifier is connected to each of the sensing electrode lines of the second group, and
wherein a non-inverting input terminal of each fingerprint sensing operational amplifier is connected to a ground level voltage source.

13. The fingerprint sensor integrated type touch screen device of claim 12, wherein the second sensing capacitor is connected between the inverting input terminal and an output terminal of each fingerprint sensing operational amplifier.

14. The fingerprint sensor integrated type touch screen device of claim 13, wherein a capacity of the first sensing capacitor is greater than a capacity of the second sensing capacitor.

15. The fingerprint sensor integrated type touch screen device of claim 5, wherein in the touch sensing mode, the touch IC senses a change in charges of a sensor input through the sensing electrode lines of the first and second groups and determines a touch or a non-touch of a conductive material.

16. The fingerprint sensor integrated type touch screen device of claim 5, wherein in the fingerprint sensing mode, the touch IC senses a change in charges of a sensor input through the sensing electrode lines of the second group and determines a fingerprint input.

* * * * *